United States Patent
Marcinowski et al.

(10) Patent No.: US 8,474,710 B2
(45) Date of Patent: Jul. 2, 2013

(54) ACCESS CONTROL PROXIMITY CARD WITH ACTUATION SENSOR

(75) Inventors: Luke Marcinowski, Milwaukee, WI (US); Greg Sanden, Hartland, WI (US); Damien Rushing, Racine, WI (US)

(73) Assignee: Honeywell International Inc., Morristown, NJ (US)

( * ) Notice: Subject to any disclaimer, the term of this patent is extended or adjusted under 35 U.S.C. 154(b) by 717 days.

(21) Appl. No.: 12/110,894

(22) Filed: Apr. 28, 2008

(65) Prior Publication Data
US 2009/0266885 A1    Oct. 29, 2009

(51) Int. Cl.
*G06K 5/00*    (2006.01)

(52) U.S. Cl.
USPC ............................................................ 235/382

(58) Field of Classification Search
USPC .......................... 235/382, 492, 380, 487, 493
See application file for complete search history.

(56) References Cited

U.S. PATENT DOCUMENTS

| | | | |
|---|---|---|---|
| 5,903,225 A | 5/1999 | Schmitt et al. | |
| 6,050,494 A * | 4/2000 | Song et al. | 235/492 |
| 6,257,486 B1 * | 7/2001 | Teicher et al. | 235/380 |
| 6,343,744 B1 * | 2/2002 | Shibata et al. | 235/492 |
| 6,360,953 B1 | 3/2002 | Lin et al. | |
| 6,535,136 B1 | 3/2003 | Rodenbeck et al. | |
| 6,588,660 B1 * | 7/2003 | Buescher et al. | 235/382 |
| 7,597,267 B2 * | 10/2009 | Miyazaki | 235/492 |
| 2005/0283633 A1 * | 12/2005 | Kozenitzky et al. | 713/600 |
| 2006/0289657 A1 * | 12/2006 | Rosenberg | 235/492 |
| 2008/0028230 A1 | 1/2008 | Shatford | |

OTHER PUBLICATIONS

IPCOM000130325D, entitled "A Method and System to Prevent Credit Card Use With RFID Technology", Disclosed by IBM, Loaded into the IP.com Prior Art Database on Oct. 9, 2005.
IPCOM000131178D, Singh, Arvinder, entitled "Access Control Utilizing a Subscriber Identity Module", Disclosed by Motorola, Loaded into the IP.com Prior Art Database on Nov. 9, 2005.

* cited by examiner

*Primary Examiner* — Seung Lee
(74) *Attorney, Agent, or Firm* — Husch Blackwell

(57) ABSTRACT

The present invention relates to access control systems using proximity cards, and in particular, to a proximity card and an associated method for controlling activation of the proximity card. The proximity card includes an actuation sensor and an access electronics system connected to the actuation sensor, the access electronics system configured to activate the proximity card in response to an input from the actuation sensor to enable communication of the access information from the proximity card.

15 Claims, 2 Drawing Sheets

ACCESS CONTROL PROXIMITY CARD WITH ACTUATION SENSOR

FIELD OF THE INVENTION

The present invention relates to access control systems using proximity cards, and in particular, to a proximity card and associated method for controlling activation of the proximity card.

BACKGROUND OF THE INVENTION

Identification cards are commonly used for personal identification or security access applications. For example, an individual may require his or her own personal identification card to gain access into a secured area such as an office building, an elevator floor, an office suite, or a parking complex. To gain access to the secured area, the individual simply places the personal identification card near a reader positioned at the entrance to the secured area so that the reader, which may be networked to a remote host computer, can identify the individual and authorize access to the secured area if appropriate.

Access control systems generally include a reader and at least one transponder embedded in a portable substrate, which is typically in the form of a plastic identification card. The identification card is carried by a person to be identified or otherwise characterized by a reader of the access control system. Communication between the reader and the identification card is enabled by cooperative resonant circuits, which are provided in each reader and identification card. Each resonant circuit includes an inductor, typically in the form of an antenna, which magnetically couples to the inductor of the other resonant circuit through mutual inductance.

Communication is initiated when the identification card is proximally positioned relative to the reader. The reader has a power supply which conveys a current to the reader resonant circuit causing the reader antenna to produce an excitation signal in the form of an electromagnetic field. The excitation signal couples to the antenna of the proximally-positioned identification card through mutual inductance, and the excitation signal powers and clocks the card circuitry initiating operation of the identification card.

The identification card generates a response signal at a specified frequency and transmits the response signal back to the reader. In particular, the card resonant circuit receives a current in response to the excitation signal which causes the card antenna to produce a response signal in the form of an electromagnetic field. The response signal couples to the reader antenna through mutual inductance in substantially the same manner as described above with respect to coupling of the excitation signal to the card antenna. The identification card typically employs frequency or amplitude modulation of the response signal to encode data stored in the memory of the card circuitry into the response signal. When the response signal couples to the reader antenna, a corresponding current is induced in the reader antenna at the specified frequency. The reader processes the induced current to read the data encoded in the response signal from the identification card.

Because identification cards typically contain private and/or confidential information, there is a concern that the information can be accessed by any card reader within the path of the card holder. Current access control systems allow anyone within the range specified by the proximity card reader to excite the field and copy the access control data, thus allowing them to gain unapproved access to a supposedly secure access point. Someone looking to intercept access card information from the identification card held on a person or in their carrying bag could accomplish this with an interceptor device, such as a custom portable proximity card reader. This interception device could be placed next to the person long enough to gain critical access card information transmitted from the proximity card.

Therefore, what is needed in the art is a device and method for controlling the activation of the proximity card to prevent unauthorized interception of the access card information.

BRIEF SUMMARY OF THE INVENTION

In one exemplary embodiment, the invention is directed to a proximity card comprising an actuation sensor and an access electronics system connected to the actuation sensor. The access electronics system is configured to activate the proximity card in response to an input from the actuation sensor to enable communication of the access information from the proximity card.

In one embodiment of the invention, the access electronics system comprises a processor for processing the input from the actuation sensor and a transmitter connected to the processor for communicating the access information to the proximity card reader.

In another embodiment of the invention, the proximity card further includes a circuit configured to communicate the input from the actuation sensor to the access electronics system.

In another embodiment of the invention, the actuation sensor comprises a push-button micro-momentary switch.

In another embodiment of the invention, the actuation sensor comprises a set of exposed contacts.

In another embodiment of the invention, the set of exposed contacts is responsive to physical contact by a user.

In another embodiment of the invention, the access control system further comprises an access control panel.

In another embodiment of the invention, the actuation sensor is coupled to an external surface of the proximity card.

In another exemplary embodiment, the present invention is directed to a method of providing access control, the method comprising providing a proximity card reader responsive to access information contained on a proximity card. The proximity card is activated in response to an input from an actuation sensor to enable communication of the access information from the proximity card.

In another embodiment of the invention, activating the proximity card comprises processing the input from the actuation sensor by an access electronics system. The access electronics system includes a processor for processing the input from the actuation sensor and a transmitter connected to the processor for communicating the access information to the proximity card reader.

In another exemplary embodiment, the present invention is directed to an access control proximity card system, the system comprising a proximity card reader responsive to access information contained on a proximity card. The proximity card includes an actuation sensor coupled to an external surface of the proximity card and an access electronics system connected to the actuation sensor. The access electronics system is configured to activate the proximity card in response to an input from the actuation sensor to enable communication of the access information from the proximity card. The access information is communicated only in response to an input from the actuation sensor.

In another embodiment of the invention, the proximity card remains deactivated until the input is received from the actuation sensor.

BRIEF DESCRIPTION OF THE DRAWINGS

These and other objects, features and advantages of the present invention will become apparent from the following detailed description of illustrative embodiments where, which is to be read in connection with the accompanying drawings, in which.

DETAILED DESCRIPTION OF THE INVENTION

Figure 1:
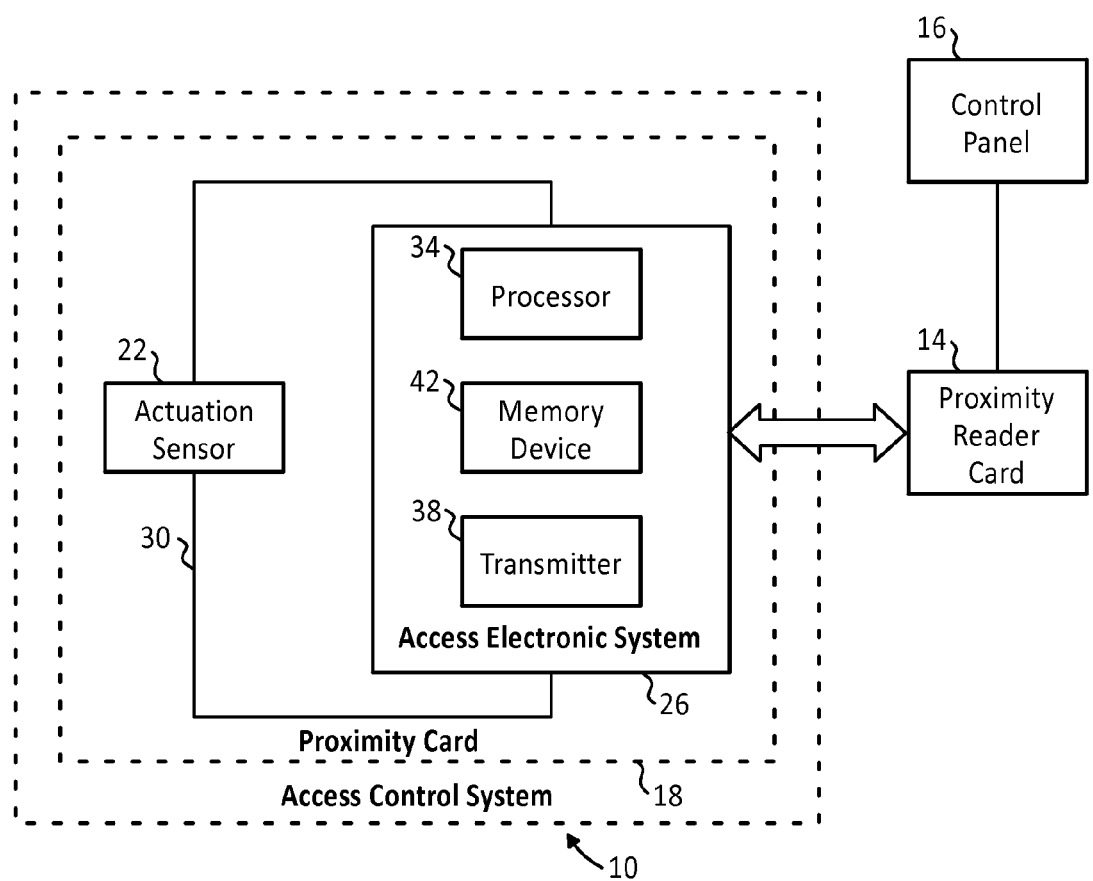
FIG. 1 illustrates a block diagram of an access control system according to an embodiment of the present invention.

The present invention, which provides a proximity card for use with an access control system and associated method for activating a proximity card to enable communication of the access information in response to an input from an actuation sensor coupled to the proximity card, will now be described in greater detail by referring to the drawings that accompany the present application. It is noted that the drawings of the present application are provided for illustrative purposes and are thus not drawn to scale.

Aspects of the invention will be described first with reference to FIG. 1, which depicts a schematic of an access control system 10 according to the present invention. The access control system 10 comprises an access control panel 16 and a proximity card reader 14 used to detect the presence of a proximity card 18 for controlling access to a security point. The proximity card reader 14 emits a signal to the proximity card 18 in the form of an electromagnetic field. The electromagnetic signal couples to a transmitter 38 embedded within the proximity card 18 through mutual inductance and provides power to initiate operation of the proximity card 18. In the exemplary embodiment shown in FIG. 1, the proximity card 18 contains no internal power source, but instead is temporarily powered by the proximity card reader via the transmitter 38. However, it can be appreciated that power may be provided by any number of different power sources, such as a battery or solar cell, or combinations thereof which are small enough to fit in the proximity card 18, and powerful enough to supply power to the components requiring such.

As shown in the block diagram of FIG. 1, the proximity card 18 includes an actuation sensor 22 coupled to and in communication with an access electronics system 26. As will be further described below, the access electronics system 26 is configured to activate the proximity card 18 in response to an input from the actuation sensor 22 to enable communication of the access information from the proximity card 18. The access information is communicated from the proximity card 18 only in response to an input from the actuation sensor 22. The proximity card remains deactivated until the input is received from a user via the actuation sensor 22.

The proximity card 18 includes a circuit 30 coupled to the actuation sensor 22 and configured to communicate the input from the actuation sensor 22 to the access electronics system 26. The circuit 30 remains "open" until the input from the actuation sensor 22 is received. Circuit 30 may be coupled to a switch that is in series to the connection of the transmitter 38, thereby shorting the transmitter 38 and not permitting the inductive coil of the transmitter 38 to power up the access electronics system 26. Once "closed," the circuit 30 is configured to transfer energy and data between the actuation sensor 22 and the access electronics system 26.

As also shown in FIG. 1, the access electronics system 26 includes a processor 34, the transmitter 38 and an optional memory device 42. The processor 34 embedded within the proximity card 18 processes the input received from the actuation sensor 22 via the circuit 30. The processor 34 may be any one of a number of conventionally known microprocessors capable of providing the control and data processing functions required by the access electronics system 26. The processor 34 operates with the memory device 42, which may be a non-volatile storage memory for storing data regarding the input from the actuation sensor 22. The memory device 42 can be used for storing programs that enable the card to function with the external proximity card reader 14.

The transmitter 38 of the access electronics system 26 is connected to the processor 34 and communicates the access information to the proximity card reader 14. Optionally, the transmitter 38 may be directly connected to the circuit 30 such that communication is enabled once the circuit 30 is closed. The transmitter 38 is configured to capture energy from the proximity card reader 14 and support two-way communication between the access electronics system 26 and the proximity card reader 14. The transmitter 38 may be a single antenna capable of performing both functions, or may comprise multiple antennae, one antenna for capturing the energy from the proximity card reader 14 and another antenna for supporting the two-way communication. The communication may be secured using conventionally known data encryption methods. In an exemplary embodiment of the invention, the transmitter 38 is a radio frequency (RF) transponder responsive to a RF signal. However, it is understood that the transmitter 38 may be responsive to a number of different communication protocols such as, Bluetooth, WiFi, and/or any other suitable wireless protocol in addition to RFID.

Figure 2:
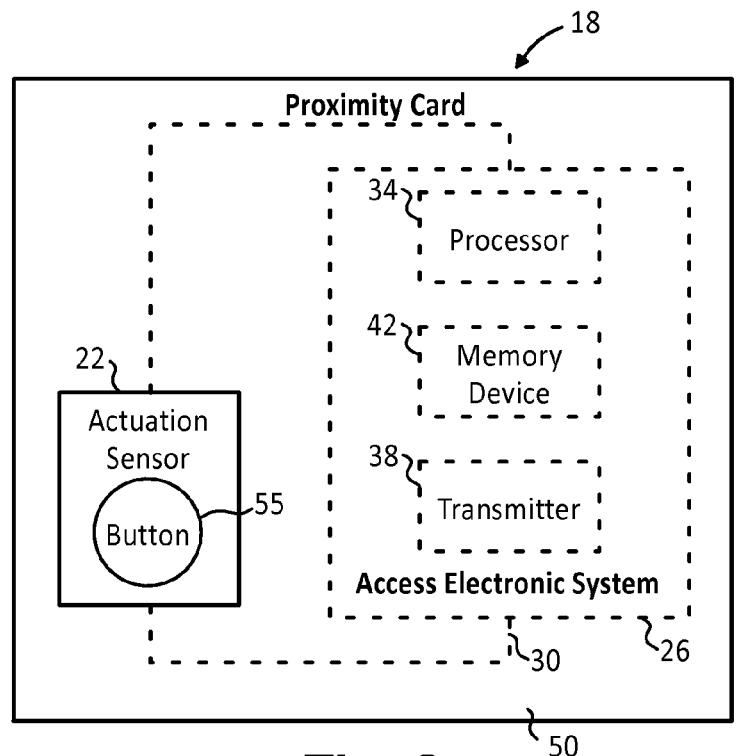
FIG. 2 illustrates a front view of a proximity card according to an embodiment of the present invention.

Turning now to FIG. 2, a front view of the actuation sensor 22 according to an embodiment of the present invention will be described in further detail. As shown, the actuation sensor 22 may comprise a push-button micro-momentary switch. The push-button micro-momentary switch includes a button 55 on the external surface 50 of the proximity card 18. Based on an input provided by a user, i.e., button 55 is depressed, a switch (not shown) coupled to the button 55 and embedded within the proximity card 18 closes the circuit 30. The input is communicated to the access electronics system 26 via the circuit 30, and the proximity card 18 is activated. Once the proximity card 18 is activated, the transmitter 38 may communicate with the proximity card reader 14. The access information contained on the proximity card 18 is relayed to the proximity card reader 14.

Figure 3:
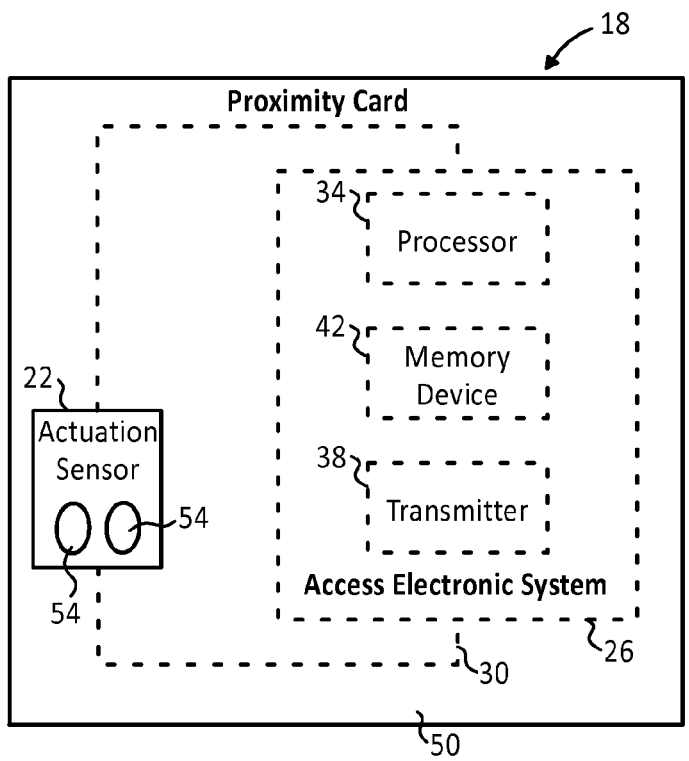
FIG. 3 illustrates a front view of a proximity card according to another embodiment of the present invention.

In the embodiment shown in FIG. 3, the actuation sensor 22 may comprise a set of exposed contacts 54 responsive to physical contact by a user. The set of exposed contacts 54 may be part of an electronic capacitance or electrostatic switching device used to detect the presence of a fingertip. An input is provided by the user, i.e., a fingertip is placed across the set of exposed contacts 54, and the difference in capacitance measured across the exposed contacts as a result of the physical contact by the user causes the processor 34 to change the state of a switch (not shown) embedded in the proximity card 18. The switch closes the circuit 30 to activate the access electronics system 26. Once the proximity card 18 is activated, the transmitter 38 may communicate with the proximity card reader 14. The access information contained on the proximity card 18 is relayed to the proximity card reader 14.

In both embodiments, the access electronics system 26 is configured to activate the proximity card 18 and communicate the access information only in response to an input from the actuation sensor 22. The proximity card remains deactivated until the input is received from the actuation sensor 22. Even though the proximity card 18 is within communication range with the proximity card reader, the proximity card 18 cannot be read unless the input is provided by the user.

Accordingly, the present invention provides a method and device for controlling the activation of the proximity card to prevent unauthorized interception of the access card information. Furthermore, it can be appreciated that the actuation sensor 22 described herein can be added to existing proximity cards to provide a cost-effective measure for adding additional security to a building.

While the present invention has been described in an illustrative manner, it should be understood that the terminology used is intended to be in a nature of words of description rather than of limitation. Furthermore, while the present invention has been described in terms of illustrative and alternate embodiments, it is to be appreciated that those skilled in the art will readily apply these teachings to other possible variations of the invention. For example, although only two illustrative embodiments have been described herein, it is understood that other actuation means and/or switching devices may be used to activate the proximity card 18 without departing from the spirit or scope of the invention.

We claim:

1. An access control proximity card, comprising:
an actuation sensor;
an access electronics system; and
a circuit connecting the access electronics system to the actuation sensor,
wherein the circuit remains open and shorts the access electronics system until input from the actuation sensor is received, the circuit is closed and transfers energy from the actuation sensor to the access electronics system when input from the actuation sensor is received, and, when the circuit is closed, the access electronics system activates the proximity card to enable communication of access information from the proximity card,
wherein the actuation sensor includes a button that causes the circuit to close or a set of exposed contacts that cause the circuit to close, each of the button or the set of exposed contacts being on an external surface of the proximity card such that the button or the set of exposed contacts is exposed to direct physical contact by a user, and
wherein the direct physical contact by the user depresses the button, causing the circuit to close, or the direct physical contact by the user causes a difference in capacitance across the set of exposed contacts, causing the circuit to close.

2. The proximity card of claim 1, wherein the access electronics system comprises:
a processor for processing the input from the actuation sensor; and
a transmitter connected to the processor for communicating the access information to the proximity card reader.

3. The proximity card of claim 1, wherein the actuation sensor comprises a push-button micro-momentary switch.

4. The proximity card of claim 1, wherein the set of exposed contacts is responsive to physical contact by a user.

5. The proximity card of claim 1, wherein the actuation sensor is coupled to an external surface of the proximity card.

6. A method of providing access control, comprising:
providing a card reader responsive to access information contained on a proximity card; and
activating the proximity card in response to an input from an actuation sensor coupled to the proximity card to enable communication of the access information from the proximity card,
wherein activating the proximity card in response to the input from the actuation sensor includes closing a circuit within the proximity card and transferring energy from the actuation sensor to an access electronics system when the input from the actuation sensor is received,
wherein the actuation sensor includes a button that causes the circuit to close or a set of exposed contacts that cause the circuit to close responsive to direct physical contact by a user, each of the button or the set of exposed contacts being on an external surface of the proximity card, and
wherein the direct physical contact by the user depresses the button, causing the circuit to close, or the direct physical contact by the user causes a difference in capacitance across the set of exposed contacts, causing the circuit to close.

7. The method of claim 6, wherein activating the proximity card comprises processing the input from the actuation sensor by an access electronics system, the access electronics system including:
a processor for processing the input from the actuation sensor; and
a transmitter connected to the processor for communicating the access information to the proximity card reader based on the input from the actuation sensor.

8. The method of claim 7, wherein the input is communicated from the actuation sensor to the access electronics system by the circuit.

9. The method of claim 6, wherein the actuation sensor comprises a push-button micro-momentary switch.

10. The method of claim 6, wherein the proximity card remains deactivated until the input is received from the actuation sensor.

11. An access control proximity card system, comprising:
a proximity card reader responsive to access information contained on a proximity card, the proximity card including:
an actuation sensor coupled to an external surface of the proximity card;
an access electronics system; and
a circuit connecting the access electronic system to the actuation sensor,
wherein the circuit remains open and shorts the access electronics system until input from the actuation sensor is received, the circuit is closed and transfers energy from the actuation sensor to the access electronics system when input from the actuation sensor is received, and, when the circuit is closed, the access electronics system activates the proximity card to enable communication of the access information from the proximity card,
wherein the actuation sensor includes a set of exposed contacts responsive to direct physical contact by a user, the set of exposed contacts being on an external surface of the proximity card, and
wherein the direct physical contact by the user causes a difference in capacitance across the set of exposed contacts, causing the circuit to close.

12. The system of claim 11, wherein the access electronics system comprises:
a processor for processing the input from the actuation sensor; and a transmitter connected to the processor for communicating the access information to the proximity card reader.

13. The system of claim 11, wherein the actuation sensor comprises a push-button micro-momentary switch.

14. The system of claim 11, wherein the access information is communicated from the card only in response to an input from the actuation sensor.

15. The system of claim 11, wherein the proximity card remains deactivated until the input is received from the actuation sensor.

* * * * *